(12) United States Patent
Piacsek et al.

(10) Patent No.: US 8,229,200 B2
(45) Date of Patent: Jul. 24, 2012

(54) METHODS AND SYSTEMS FOR MONITORING TUMOR BURDEN

(75) Inventors: Kelly Lynn Piacsek, Pewaukee, WI (US); Saad Ahmed Sirohey, Pewaukee, WI (US); Matthieu Denis Ferrant, Saint Remy les Chevreuse (FR); Gopal B. Avinash, New Berlin, WI (US)

(73) Assignee: General Electric Company, Schenectady, NY (US)

( * ) Notice: Subject to any disclaimer, the term of this patent is extended or adjusted under 35 U.S.C. 154(b) by 892 days.

(21) Appl. No.: 11/079,694

(22) Filed: Mar. 14, 2005

(65) Prior Publication Data

US 2006/0242146 A1    Oct. 26, 2006

(51) Int. Cl.
*G06K 9/00* (2006.01)
*G06K 9/40* (2006.01)

(52) U.S. Cl. ........ 382/131; 382/128; 382/132; 382/154; 382/260

(58) Field of Classification Search .................. 328/128; 707/7; 382/128, 130–132, 260
See application file for complete search history.

(56) References Cited

U.S. PATENT DOCUMENTS

| | | | |
|---|---|---|---|
| 5,255,187 A | 10/1993 | Sorensen | |
| 5,823,993 A | 10/1998 | Lemelson | |
| 5,917,929 A | 6/1999 | Marshall et al. | |
| 6,125,194 A * | 9/2000 | Yeh et al. | 382/132 |
| 6,266,435 B1 | 7/2001 | Wang | |
| 6,434,262 B2 | 8/2002 | Wang | |
| 6,597,762 B1 | 7/2003 | Ferrant et al. | |
| 6,891,964 B2 * | 5/2005 | Doi et al. | 382/131 |
| 7,697,739 B2 | 4/2010 | Sakaida | |
| 2002/0028006 A1 * | 3/2002 | Novak et al. | 382/128 |
| 2003/0016850 A1 * | 1/2003 | Kaufman et al. | 382/128 |
| 2003/0016859 A1 | 1/2003 | Weisgerber et al. | |
| 2003/0220563 A1 * | 11/2003 | Schutt | 600/431 |
| 2005/0004452 A1 * | 1/2005 | Hertel et al. | 600/427 |
| 2005/0041869 A1 | 2/2005 | Cathier | |
| 2005/0111720 A1 * | 5/2005 | Gurcan et al. | 382/131 |
| 2005/0244042 A1 * | 11/2005 | Sirohey et al. | 382/131 |
| 2005/0259856 A1 * | 11/2005 | Dehmeshki | 382/131 |
| 2006/0079743 A1 * | 4/2006 | Ferrant et al. | 600/407 |

FOREIGN PATENT DOCUMENTS

| | | |
|---|---|---|
| JP | 2003010171 A | 1/2003 |
| JP | 2003250794 | 9/2003 |
| JP | 2003250794 A * | 9/2003 |

(Continued)

OTHER PUBLICATIONS

Wiemker et al., "Optimal thresholding for 3D segmentation of pulmonary nodules in high resolution CT", International Congress Series, vol. 1230, Jun. 2001, pp. 653-658 Computer Assisted Radiology and Surgery.*

(Continued)

*Primary Examiner* — Anand Bhatnagar
*Assistant Examiner* — Soo Park
(74) *Attorney, Agent, or Firm* — Armstrong Teasdale LLP

(57) ABSTRACT

Methods and systems for quantification of a selected attribute of an image volume are provided. The system is configured to receive an image dataset for a volume of interest, process the dataset for a selected attribute based at least on one of shape and texture to obtain a plurality of responses, and compute an index of an aggregate of a plurality of obtained responses.

48 Claims, 7 Drawing Sheets

500

| Tumor | Vol (mm³) |
|---|---|
| 1. | 20 |
| 2. | 63 |
| 3. | 12 |
| 4. | 11 |
| 5. | 10 |
| 6. | 48 |

TTB=164 mm³ ← 504

502

FOREIGN PATENT DOCUMENTS

| JP | 2004152043 A | 5/2004 |
| JP | 2005034473 A | 2/2005 |

OTHER PUBLICATIONS

NL International Search Report for Application No. 1031359, dated Nov. 14, 2007.

Derwent Publications Ltd., London, GB; 2003-654775; XP002458571, dated Nov. 16, 2007.

Sato, Y et al; Tissue Classification Based on 3D Local Intensity Structures for Volume Rendering; IEEE Transactions on Visualization and Computer Graphics, vol. 6, pp. 160-180, 2000.

Sato Y et al; Three-Dimensional Multi-Scale Line Filter for Segmentation and Visualization of Curvilinear Structures in Medical Images; Med. Image Analysis; vol. 2, pp. 143-168, 1998.

Li, Q et al; Selective Enhancement Filters for Nodules, Vessels, and Airway Walls in Two- and Three-Dimensional CT Scans; Med.Phys. vol. 30, No. 8, pp. 2040-2051, 2003.

McCulloch, C et al; Reader Variability and Computer Aided Detection of Suspicious Lesions in Low-Dose CT Lung Screening Exams; Radiology 2003:226(2):37A.

Li, F et al; Lung Cancers Missed at Low-Dose Helical CT Screening in a General Population: Comparison of Clinical, Histopathologic, & Imaging Findings; Radiology 2002;225(3)673-683.

Kakinuma, R et al.; Detection Failures in Spiral CT Screening for Lung Cancer: Analysis of CT Findings; Radiology 1999 212:61-66.

Japanese Office Action, Application No. 2006-063559, dated Oct. 31, 2011, pp. 2.

* cited by examiner

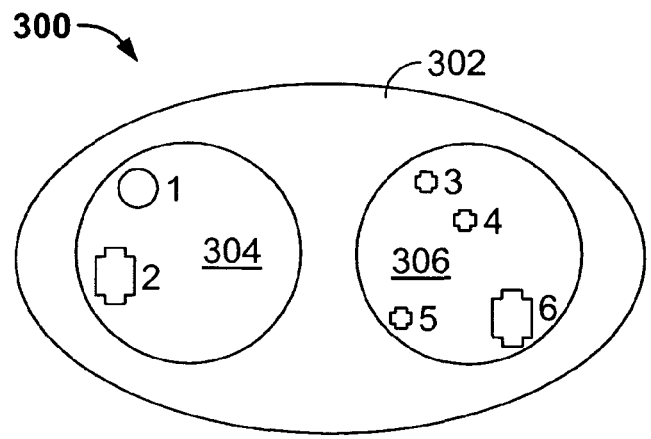
FIG. 3
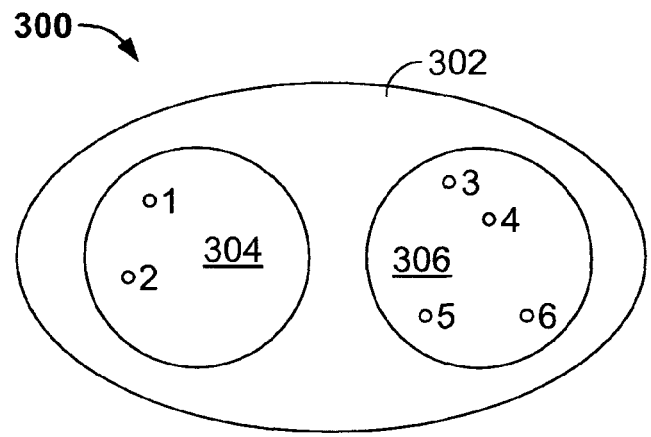
FIG. 4
| Tumor | Vol (mm$^3$) |
|---|---|
| 1. | 20 |
| 2. | 63 |
| 3. | 12 |
| 4. | 11 |
| 5. | 10 |
| 6. | 48 |
| TTB=164 mm$^3$ | |
FIG. 5

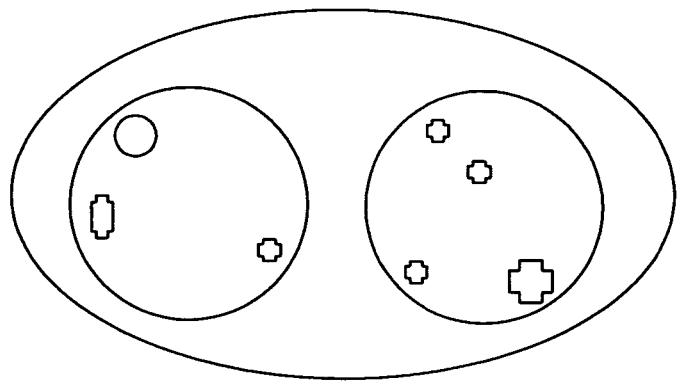
FIG. 6
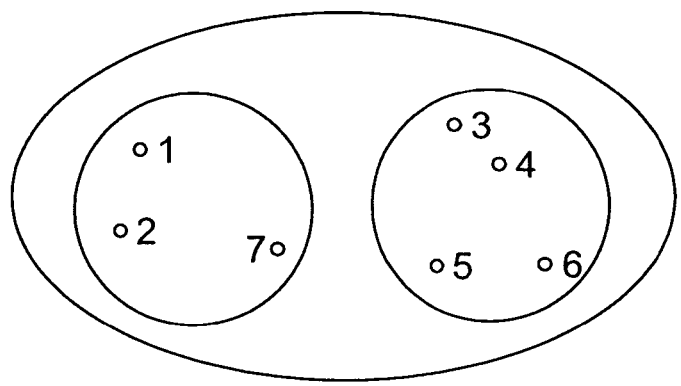
FIG. 7
| Tumor | Vol (mm³) | |
|---|---|---|
| 1. | 20 | 18 |
| 2. | 63 | 19 |
| 3. | 12 | 12 |
| 4. | 11 | 13 |
| 5. | 10 | 9 |
| 6. | 48 | 35 |
| 7. | -- | 12 |
| TTB=164 mm³ | | 118 mm³ |
FIG. 8

METHODS AND SYSTEMS FOR MONITORING TUMOR BURDEN

BACKGROUND OF THE INVENTION

This invention relates generally to computed tomography (CT) imaging and more particularly, to quantification of a selected attribute of an image volume and monitoring changes of the selected attribute in a patient.

Visualization of anatomical data acquired by imaging devices generating 3D data is typically handled by volume rendering of its intensity and/or density values (Hounsfield Units (HU) in the case of Computed Tomography for instance). Many clinical applications are based on 3D visualization of the volumetric data that may include, but are not limited to, detection and sizing of lung nodules, quantification of vessel curvature, diameter and tone, cardiac vascular and function applications, and navigation of the colon for detection of polyps. These applications rely on the absolute values of the image data (intensity, density (HU), uptake (standard uptake values (SUV)), and other material properties associated with medical imaging to differentiate multi-dimensional anatomies from background tissue. Some clinical imaging applications are designed for routine screening of early cancers in the form of, for example, tumors, nodules, and polyps.

Many cancers commonly metastasize or move from their primary organ or location to involve another organ or location. The most common location for tumors to metastasize to is lymph nodes followed by lung, liver, and then bone. Frequently, metastatic disease presents as a distribution of small lesions (2-10 mm) throughout the anatomy of the body. Most common locations for metastatic lesions are in the lung and liver. The visual contrast of liver lesions on CT images is limiting to the human eye. Magnetic Resonance Imaging (MRI) and Positron Emission Tomography (PET) imaging have proven superior to CT for visualizing liver tumors, but contrast remains limited.

There are many treatment options for primary and secondary cancers. These may include radiation therapy, chemotherapy, hormone treatment, immune therapy, surgery and others.

To date, physicians rely significantly on the apparent anatomical size and shape of the tumor under treatment when assessing the patients response to a chosen therapy. This can be problematic in patients with "bulky disease" (meaning that the tumor burden is an overestimate of the actual presence of cancer cells) if the cancer remises, but the relative size of the tissue mass does not change. Since the inception of PET and CT/PET imaging, the size of the active portion of the tumor can be when assessed to determine patient response to therapy. The physician may desire to measure the size of the lesion(s) before and after subsequent treatments to quantify the response. In many cases of a primary cancer, it may be straightforward to quantify the volume of anatomy occupied by a lesion. Under some circumstances, a tumor can have limited contrast and/or be ill-defined, meaning that the boundaries of the tumor are difficult to identify. In the case of multiple lesions and metastatic disease, there may be hundreds of small lesions distributed throughout the body or within individual organs. However, when there are multiple lesions, it is extremely time consuming to identify and track each individual lesion. Additionally, physicians may choose to represent the sum total of the volume occupied by all of the lesions in terms of a single number called "Total Tumor Burden" (TTB). As such, when any of the tumors respond to a chosen treatment plan, the TTB will change. However, even tracking TTB over the course of a treatment regime may also require a difficult and time consuming procedure.

BRIEF DESCRIPTION OF THE INVENTION

In one embodiment, a system for quantification of a selected attribute of an image volume is provided. The system is configured to receive an image dataset for a volume of interest, process the dataset for a selected attribute based at least on one of shape and texture to obtain a plurality of responses, and compute an index of an aggregate of a plurality of obtained responses.

In another embodiment, an imaging system is provided. The imaging system includes an image acquisition portion for acquiring image data, a controller configured to control the image acquisition portion, and a processor configured to quantify a selected attribute of an image volume and monitor changes of the selected attribute. The processor is further programmed to receive an image dataset for a volume of interest from at least one of an X-ray modality, a CT modality, an ultrasound modality, a magnetic resonance imaging (MRI) modality, a positron emission tomography (PET) modality, a nuclear medicine modality, an optical modality, and a combination of modalities, to process the dataset for a selected attribute based at least on one of shape and texture to obtain a plurality of responses, and to compute an index of an aggregate of a plurality of obtained responses.

In yet another embodiment, a method for quantification of a selected attribute of an image volume and monitoring changes of the selected attribute is provided. The method includes receiving an image dataset for a volume of interest, processing the dataset for a selected attribute based at least on one of shape and texture to obtain a plurality of responses, and computing an index of an aggregate of the plurality of obtained responses.

BRIEF DESCRIPTION OF THE DRAWINGS

FIG. 3 is a schematic view of a volume of interest (VOI), such as a portion of patient;

FIG. 4 is another schematic view of the volume of interest (VOI) shown in FIG. 3;

FIG. 5 is a table of determined volumes of each response 1-6 shown in FIG. 4;

FIG. 6 is a schematic view of the VOI shown in FIG. 3 illustrating data received at a later point in time, for example, following a course of therapy;

FIG. 7 is a schematic view of the VOI shown in FIG. 6.

FIG. 8 is a table 800 of updated determined volumes of responses 1-7 shown in FIG. 7;

DETAILED DESCRIPTION OF THE INVENTION

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Also as used herein, the phrase "reconstructing an image" is not intended to exclude embodiments of the present invention in which data representing an image is generated but a viewable image is not. Therefore, as used herein the term, "image," broadly refers to both viewable images and data representing a viewable image. However, many embodiments generate (or are configured to generate) at least one viewable image.

Figure 1:
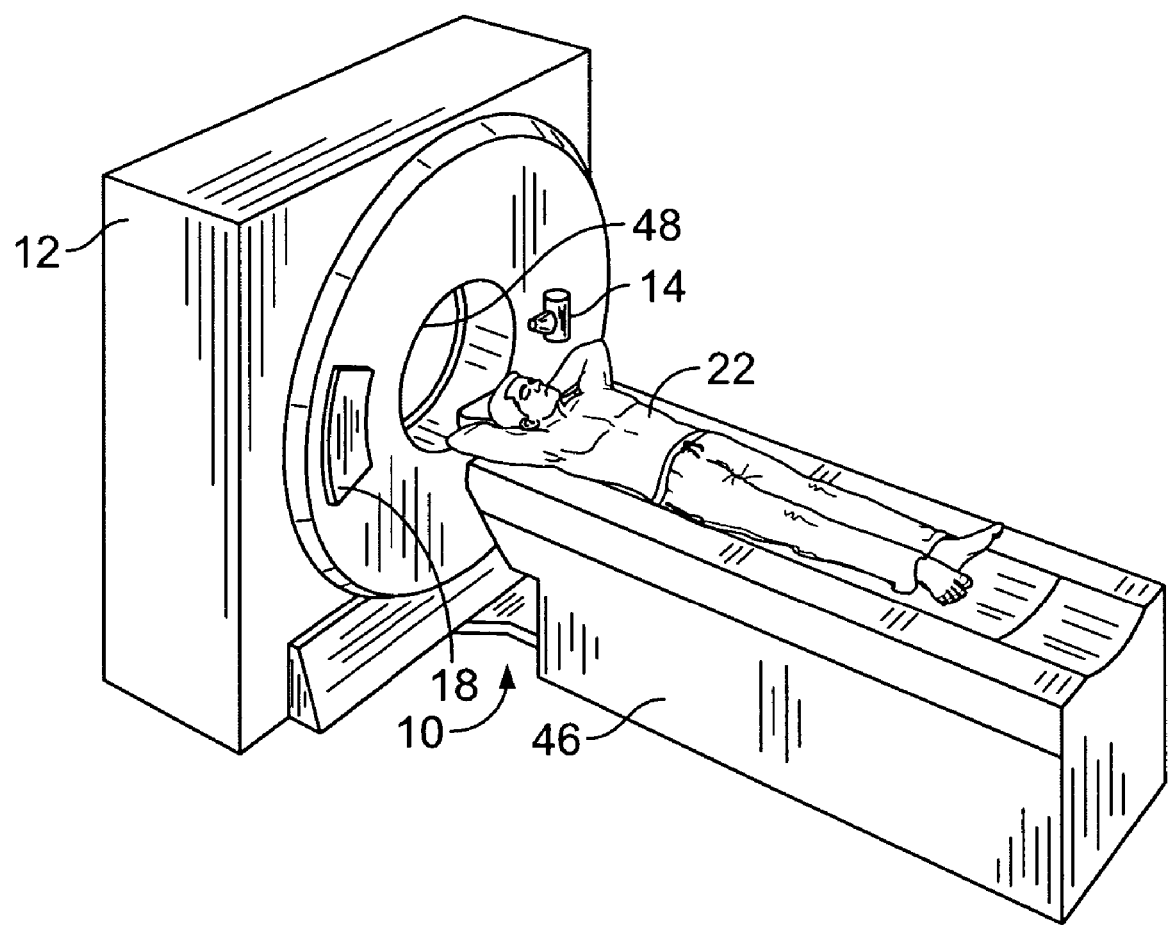
FIG. 1 is a pictorial view of a multi slice volumetric CT imaging system.
Figure 2:
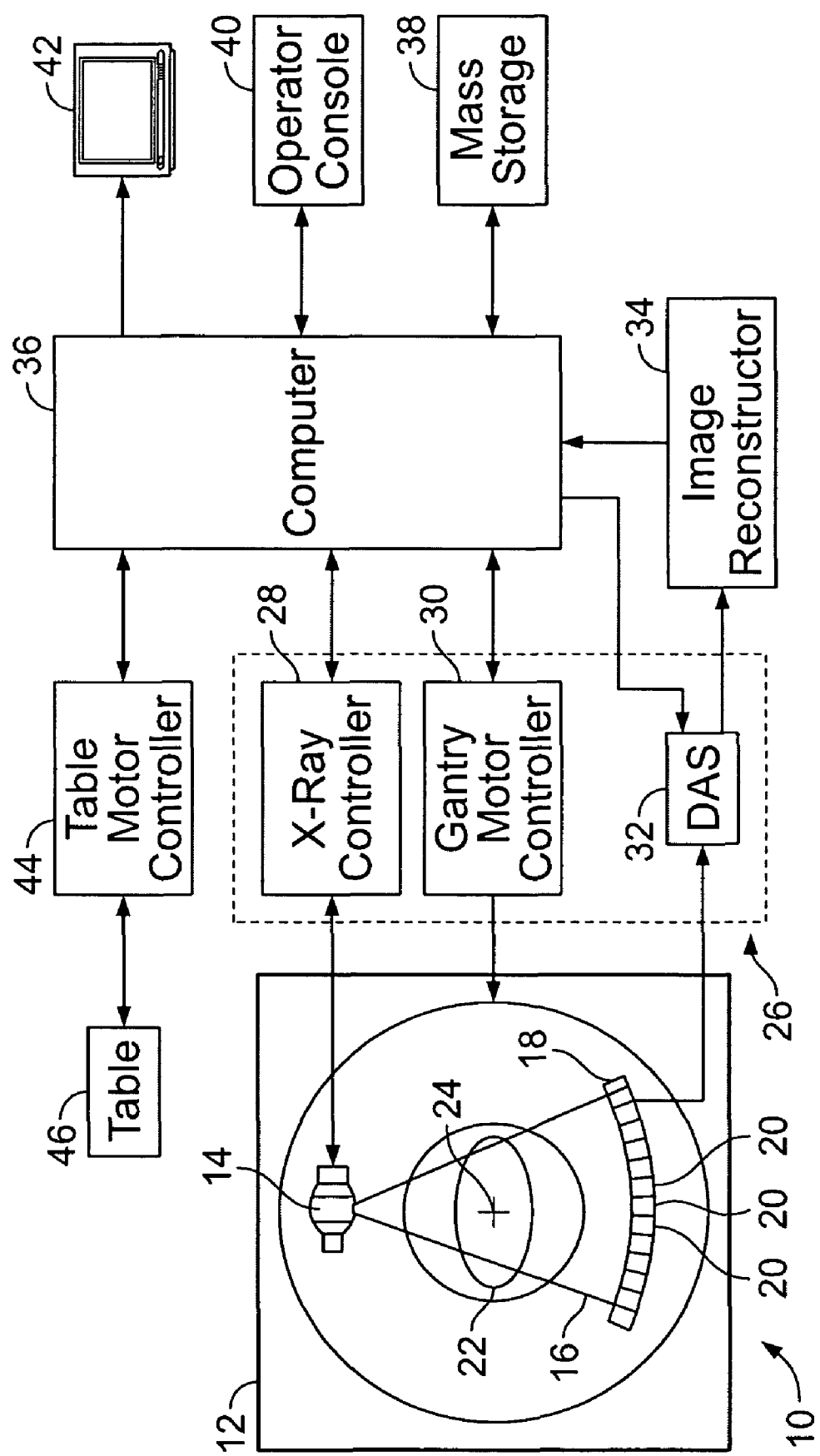
FIG. 2 is a block schematic diagram of the multi slice volumetric CT imaging system illustrated in FIG. 1.

FIG. 1 is a pictorial view of a multi slice volumetric CT imaging system 10. FIG. 2 is a block schematic diagram of system 10 illustrated in FIG. 1. In the exemplary embodiment, a computed tomography (CT) imaging system 10, is shown as including a gantry 12 representative of a "third generation" CT imaging system. Gantry 12 has a radiation source 14 that projects a cone beam 16 of x-rays toward a detector array 18 on the opposite side of gantry 12.

Detector array 18 is formed by a plurality of detector rows (not shown) including a plurality of detector elements 20, which together sense the projected x-ray beams that pass through an object, such as a medical patient 22. Each detector element 20 produces an electrical signal that represents the intensity of an impinging radiation beam and hence the attenuation of the beam as it passes through patient 22. An imaging system 10 having a multislice detector array 18 is capable of providing a plurality of images representative of patient 22. Each image of the plurality of images corresponds to a separate "slice" of the volume. The "thickness" or aperture of the slice is dependent upon the thickness of the detector rows.

During a scan to acquire radiation projection data, gantry 12 and the components mounted thereon rotate about an axis of rotation 24. FIG. 2 shows only a single row of detector elements 20 (i.e., a detector row). However, multislice detector array 18 includes a plurality of parallel detector rows of detector elements 20 such that projection data corresponding to a plurality of quasi-parallel or parallel slices can be acquired simultaneously during a scan.

Rotation of gantry 12 and the operation of radiation source 14 are governed by a control mechanism 26 of CT system 10. Control mechanism 26 includes a radiation controller 28 that provides power and timing signals to radiation source 14 and a gantry motor controller 30 that controls the rotational speed and position of gantry 12. A data acquisition system (DAS) 32 in control mechanism 26 samples analog data from detector elements 20 and converts the data to digital signals for subsequent processing. An image reconstructor 34 receives sampled and digitized radiation data from DAS 32 and performs high-speed image reconstruction. The reconstructed image is applied as an input to a computer 36, which stores the image in a mass storage device 38.

Computer 36 also receives commands and scanning parameters from an operator via console 40 that has a keyboard. An associated display 42 allows the operator to observe the reconstructed image and other data from computer 36. The operator supplied commands and parameters are used by computer 36 to provide control signals and information to DAS 32, radiation controller 28, and gantry motor controller 30. In addition, computer 36 operates a table motor controller 44 that controls a motorized table 46 to position patient 22 in gantry 12. Particularly, table 46 moves portions of patient 22 through gantry opening 48.

In one embodiment, computer 36 includes a device 50, for example, a floppy disk drive or CD-ROM drive, for reading instructions and/or data from a computer-readable medium 52, such as a floppy disk or CD-ROM. In another embodiment, computer 36 executes instructions stored in firmware (not shown). Generally, a processor in at least one of DAS 32, reconstructor 34, and computer 36 shown in FIG. 2 is programmed to execute the processes described below. Of course, the method is not limited to practice in CT system 10 and can be utilized in connection with many other types and variations of imaging systems. In one embodiment, computer 36 is programmed to perform functions described herein, accordingly, as used herein, the term computer is not limited to just those integrated circuits referred to in the art as computers, but broadly refers to computers, processors, microcontrollers, microcomputers, programmable logic controllers, application specific integrated circuits, and other programmable circuits.

Set forth below is a description of an exemplary multislice CT system in accordance with one embodiment of the present invention. Although one embodiment of the system is described in detail below, it should be understood that many alternative embodiments of the inventions are possible. For example, although one particular detector and one particular data acquisition system are described, other detectors or data acquisition systems could be used in connection with the system, and the present invention is not limited to practice with any one particular type of detector. Specifically, the detector described below includes a plurality of modules and each module includes a plurality of detector cells. Rather than the specific detector described below, a detector which has non-segmented cells along the z-axis, and/or a detector which has multiple modules with multiple elements along the x-axis and/or z-axis joined together in either direction to acquire multislice scan data simultaneously, can be utilized. Generally, the system is operable in a multislice mode to collect one or more slices of data. Axial and helical scans can be performed with the system, and cross section images of a scanned object can be processed, reconstructed, displayed, and/or archived.

FIG. 3 is a schematic view of a volume of interest (VOI) 300, such as a portion 302 of patient 22. In the exemplary embodiment, VOI 300 includes one or more bodies such as a first organ 304 and a second organ 306. A scan of VOI 300 may detect various responses (1-6), such as anatomies and pathologies of interest.

The herein described methods and apparatus enable a real-time implementation of shape filtering methods on anisotropic volumetric datasets for the purpose of tracking longitudinal changes in shape and size of various anatomies and pathologies. Lung metastases are used to describe various embodiments of the present invention, but it should be noted that other applications, for example, but not limited to radiology oncology, neurology, perfusion, vessel analysis, colon, lung, and heart vessels segmentation are contemplated.

An embodiment of the present invention includes performing anatomical shape filtering and visualization of a 3-dimensional volumetric dataset corresponding to VOI 300. The output of the 3D shape filtering can be segregated into different response types depending on the current process. In one exemplary illustration the segregation may be in the form of a degree of cylindricalness or sphericalness of the underlying object. The response of this filtering may also have an underlying scale component that creates equivalence to both the size and the shape of the underlying object, i.e. the filtering may be tuned to respond maximally to cylinders (and spheres) that have a diameter of 8 mm and being non-maximal if the underlying object deviates in size or shape from the desired tuned value. The shape responses may be displayed independently or overlaid on the image data represented in either 2D or volumetric 3D rendering. A method similar to the currently available Window and Level (W/L) operation is applied to the filtered responses that allow the user to selectively display the responses that they want to see, in essence providing the user with the ability to tune the sensitivity to non-maximal responses. This method can be applied independently to the filtering responses. This method also permits merging of disparate responses for a combined display without loosing the ability for the user to W/L. This ability is achieved using two complementary methods, the first created an artificial datum point in response space that allowed the response data to be segregated in a mirrored sense about this datum and the second used similarly mirrored color map with appropriate transfer functions. The result of these methods is that the user can apply the selective W/L and the disparate responses of the filtering (e.g. spherical and cylindrical) are simultaneously displayed independently or on the image data using their own color map for visual distinction.

The volume containing the anatomical body of interest is identified using anatomical density values of the lung in association with morphological operations. Multi resolution sampling is performed so that the volume is represented at different scales. Downsampling is performed in conjunction with a Gaussian smoothing to minimize aliasing artifacts. A discrete approximation to convolving a volume with the analytical derivative of a Gaussian filter is determined and responses to spherical and cylindrical anatomical objects, nodules and vessels respectively are displayed.

FIG. 4 is a schematic view of volume of interest (VOI) 300 (shown in FIG. 3). The centers of responses 1-6 are identified to provide three-dimensional references to individual tumors within the imaged VOI 300. 3D pointers to the individual tumors are used to assess volume of each tumor and the volumes of all of the tumors are summed to compute total tumor burden (TTB). In an alternative embodiment, the volumes are not assessed for each individual tumor, but rather the volume is assessed globally for body of interest, wherein no summation of individual tumors is needed, as TTB is determined directly.

FIG. 5 is a table 500 of determined volumes 502 of each response 1-6. A total tumor burden (TTB) 504 may be determined and displayed. TTB is determined by combining the volumes of one or more of responses 1-6. In the exemplary embodiment, the individual volumes of responses 1-6 are added together to determine TTB 504. In other various embodiments, other methods of combining the volumes may be used.

FIG. 6 is a schematic view of VOI 300 (shown in FIG. 3) illustrating data received at a later point in time, for example, following a course of therapy. The change of TTB 504 for VOI 300 may be determined between successive time points by subtraction, division or other mathematical expression.

FIG. 7 is a schematic view of VOI 300 (shown in FIG. 6). The centers of responses 1-6 are identified and an additional detected response 7 is also identified and its center determined.

FIG. 8 is a table 800 of updated determined volumes 802 of responses 1-7. A total tumor burden (TTB) 804 may be determined and displayed. TTB is determined by combining the volumes of one or more of responses 1-7. In the exemplary embodiment, the individual volumes of responses 1-7 are added together to determine TTB 804. In other various embodiments, other methods of combining the volumes may be used. A difference value between successive time points for each volume may also be determined and displayed. The difference value may be expressed as a magnitude change from a previous value or may be expressed as a relative change from the previous value, such as a percentage change from the previous value. In an alternative embodiment, the TTB is determined directly for the entire body of interest.

This process may also be repeated in a secondary image, such as an image obtained from an alternative imaging modality that is registered to the first image and the difference in the detected volumes is computed. For example, performing the shape based filtering in both a CT and a PET image may provide information pertaining to the anatomic tumor burden (ATB), from CT, as well as the physiologic tumor burden (PTB), from PET. Repeating this analysis at a later time point will reveal the level at which the therapy has made an impact because typically, anatomic changes lag physiologic changes.

Figure 9:
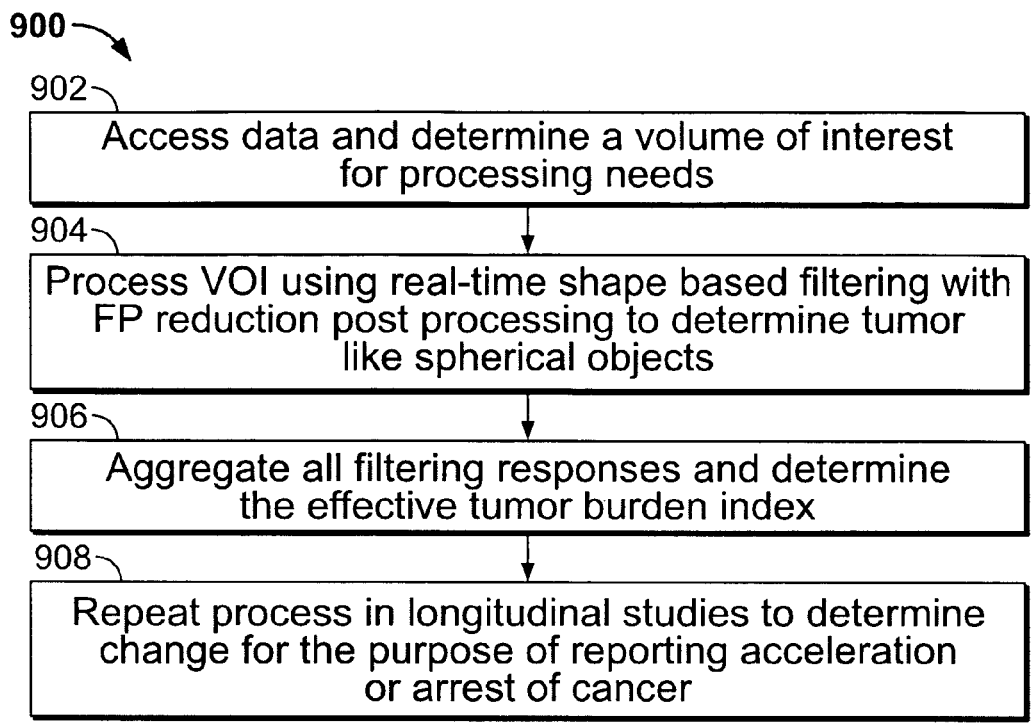
FIG. 9 is a flowchart of an exemplary method to determine a tumor burden index for a volume of interest.

The detection of all volumes may also be filtered so as to automatically only follow-up the evolution of a subset of lesions (such as the 5 largest lesions for instance) as recommended by the WHO and RECIST criteria. Such measurements include determining the evolution of their average or total volume of a subset of lesions, determining the maximum decrease/increase in volume of any of these lesions FIG. 9 is a flowchart for an exemplary method 900 to determine a tumor burden index for a volume of interest. In the exemplary embodiment, the tumor burden is determined from all identified voxels following real-time spherical shape filtering. Method 900 includes accessing or receiving 902 multidimensional data from, for example a CT imaging scan. In various alternative embodiments, the multidimensional data may be received from various scans from, for example, but not limited to, an X-ray modality, a CT modality, an ultrasound modality, a magnetic resonance imaging (MRI) modality, a positron emission tomography (PET) modality, a nuclear medicine modality, an optical modality, and a combination of modalities using raw data, projection data, and/or image data. The multidimensional data may be, for example, but not limited to, radiology data, oncology data, neurological data, cardiac data, chest data, musculoskeletal data, vascular data, and interventional data. A region or volume of interest from the received data is determined. The volume of interest may be selected by a user or may be determined automatically using predetermined attributes of the data to locate at least a subset of the multidimensional data to include within the volume of interest.

The VOI is processed 904 using real-time shape based filtering with FP reduction post processing to determine tumor-like spherical objects. The filtering responses are aggregated 906 to determine an effective Tumor Burden Index. The processing is repeated 908 in longitudinal studies to determine change for the purpose of reporting acceleration or arrest of cancer.

The methods described above may further include detecting spherical regions in an image of the object using 3D shape based filtering. The identified locations of the spherical voxels may be aggregated to form a tumor burden index wherein the results are tracked over longitudinal exams for change determination. The tumor burden index may be trended over time and/or a population for various statistical analyses. The tumor burden index for a plurality of imaging modalities may be combined to provide additional information for the decision rule engine.

Figure 10:
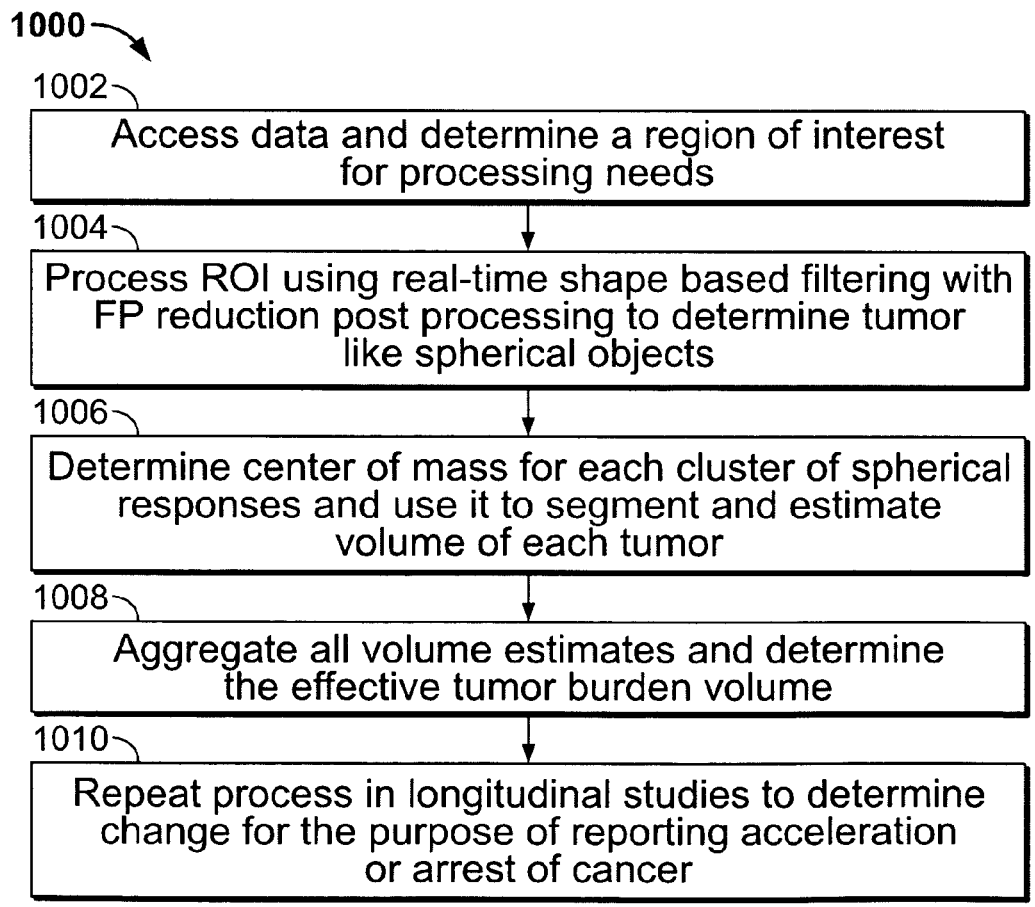
FIG. 10 is a flowchart of another exemplary method to determine a tumor burden index for a volume of interest.

FIG. 10 is a flowchart for an exemplary method 1000 to determine a tumor burden index for a volume of interest. The 1000 may determine total tumor burden volume using real-time shape filtering followed by center of mass determination of each identified region and using these centers to segment and size the tumors. Method 900 may further include detecting spherical regions in an image of the object using 3D-shape based filtering followed by post processing to determine the center of mass of each cluster of detections. Each of the identified locations is fed to a volumetric segmentation algorithm that estimates the volume of individual tumor candidates. The individual volume estimates are aggregated to form a total tumor volume. The results are tracked over longitudinal exams for change determination.

Method 1000 includes accessing or receiving 1002 multi-dimensional data from, for example a CT imaging scan. In various alternative embodiments, the multidimensional data may be received from various scans from, for example, but not limited to, an X-ray modality, a CT modality, an ultrasound modality, a magnetic resonance imaging (MRI) modality, a positron emission tomography (PET) modality, a nuclear medicine modality, an optical modality, and a combination of modalities using raw data, projection data, and/or image data. The multidimensional data may be, for example, but not limited to, radiology data, oncology data, neurological data, cardiac data, chest data, musculoskeletal data, vascular data, and interventional data. A region or volume of interest from the received data is determined. The volume of interest may be selected by a user or may be determined automatically using predetermined attributes of the data to locate at least a subset of the multidimensional data to include within the volume of interest.

The VOI is processed 904 using real-time shape based filtering with FP reduction post processing to determine tumor-like spherical objects. A center of mass for each cluster of spherical responses is determined and is used to segment and estimate the volume of each of the spherical responses. The volume estimates are aggregated 1008 to determine an effective tumor burden volume. The processing is repeated 1010 in longitudinal studies to determine change for the purpose of reporting acceleration or arrest of cancer.

Figure 11:
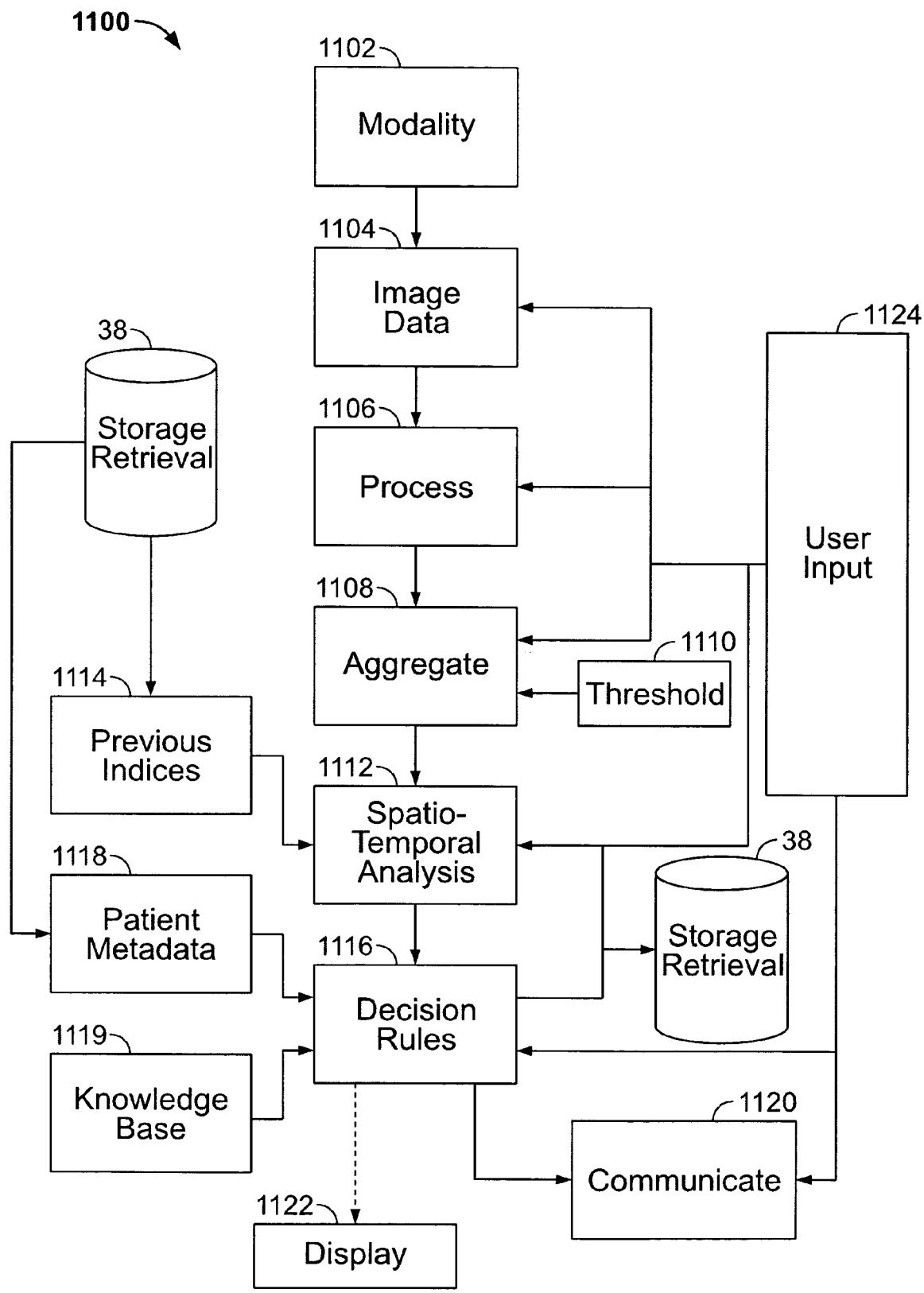
FIG. 11 is a data flow diagram of an exemplary embodiment of the present invention as generally applied to a plurality of imaging and diagnostic solutions.

FIG. 11 is a data flow diagram 1100 of an exemplary embodiment of the present invention as generally applied to a plurality of imaging and diagnostic solutions. Multidimensional data is obtained using a scan of any of various modalities of imaging systems 1102. For example, data may be acquired during scans of an X-ray modality, a CT modality, an ultrasound modality, a magnetic resonance imaging (MRI) modality, a positron emission tomography (PET) modality, a nuclear medicine modality, an optical modality, and a combination of modalities. The image data 1104 may be, for example, radiology data, oncology data, neurological data, cardiac data, chest data, musculoskeletal data, vascular data, and interventional data. Image data 1104 may be processed 1106 using filtering, such as 3D shape based filtering and/or derivation of attributes not directly determinable. For example, image data 1104 may be filtered for an image texture, a shape, a Hounsfield number, a standard uptake value (SUV), an anatomical structure, and/or a diameter, and may derive, for example, a perfusion and/or a flow from the image dataset.

The processed data may be analyzed using a selectable threshold 1110, such as a high threshold, low threshold, or high-low threshold to detect spherical regions in the image data. The identified locations spherical voxels are aggregated 1108 to form a tumor burden index and the results may be trended using spatio-temporal analysis over longitudinal exams using previous indices 1114 for change determination. In an alternative embodiment, a plurality of spherical regions in the image data may be detected using 3D shape based filtering followed by post processing to determine the center of mass of each cluster of detections. Each of the identified locations is input to a volumetric segmentation algorithm that estimates the volume of individual tumor candidates. The individual volume estimates are aggregated to form a total tumor volume. The results may be trended over longitudinal exams for change determination.

The detection of all regions can also be filtered so as to automatically only follow-up the evolution of a subset of tumors (such as the 5 largest lesions for instance). Such measurements may include computing the evolution of the average or total volume of a subset of tumors and/or computing a maximum decrease/increase in volume of any of these tumors. A decision rules engine 1116 may be applied to the aggregate data such that changes in the number of tumors, an individual tumor size, an aggregate tumor size, and/or other volume of interest attributes may be used to determine a diagnosis and/or recommended course of treatment. Decision rules engine 1116 receives data from a source 1118 of patient metadata that may include, but is not limited to, patient genetic data, patient family history data, histo-pathology data, patient allergy data, and a patient medical history.

Decision rules engine 1116 may receive data from various databases 1119, such as a diagnosis knowledge base and/or a disease-treatment knowledge base that may reside locally in a memory accessible through data storage device 38. Databases that are accessible via a network such as the Internet may also be used by decision rules engine 1116. The diagnosis and recommended treatment and other results of applying decision rule engine 1116 may be communicated 1120 to a user via a display 1122 and may be transmitted over a network to other users. The results of applying decision rule engine 1116 may be binary responses, such as, the tumor burden is better or worse. The response may be a metric such as a volume quantity of tumor burden or number of tumor nodules. The response may include a detailed history of the patient detailing a progression of a disease and/or treatment.

User input from a user input module 1124 may be used to modify or edit the algorithm used to generate the output update parameters or update parameters used by the algorithm. User input module 1124 may be a stand alone man machine interface or may be a part of an existing imaging system controller. The user input may be manually entered into input module 1124 or may be an output of a logic code segment embodied in software, firmware, and/or hardware accessible to system 10.

Figure 12:
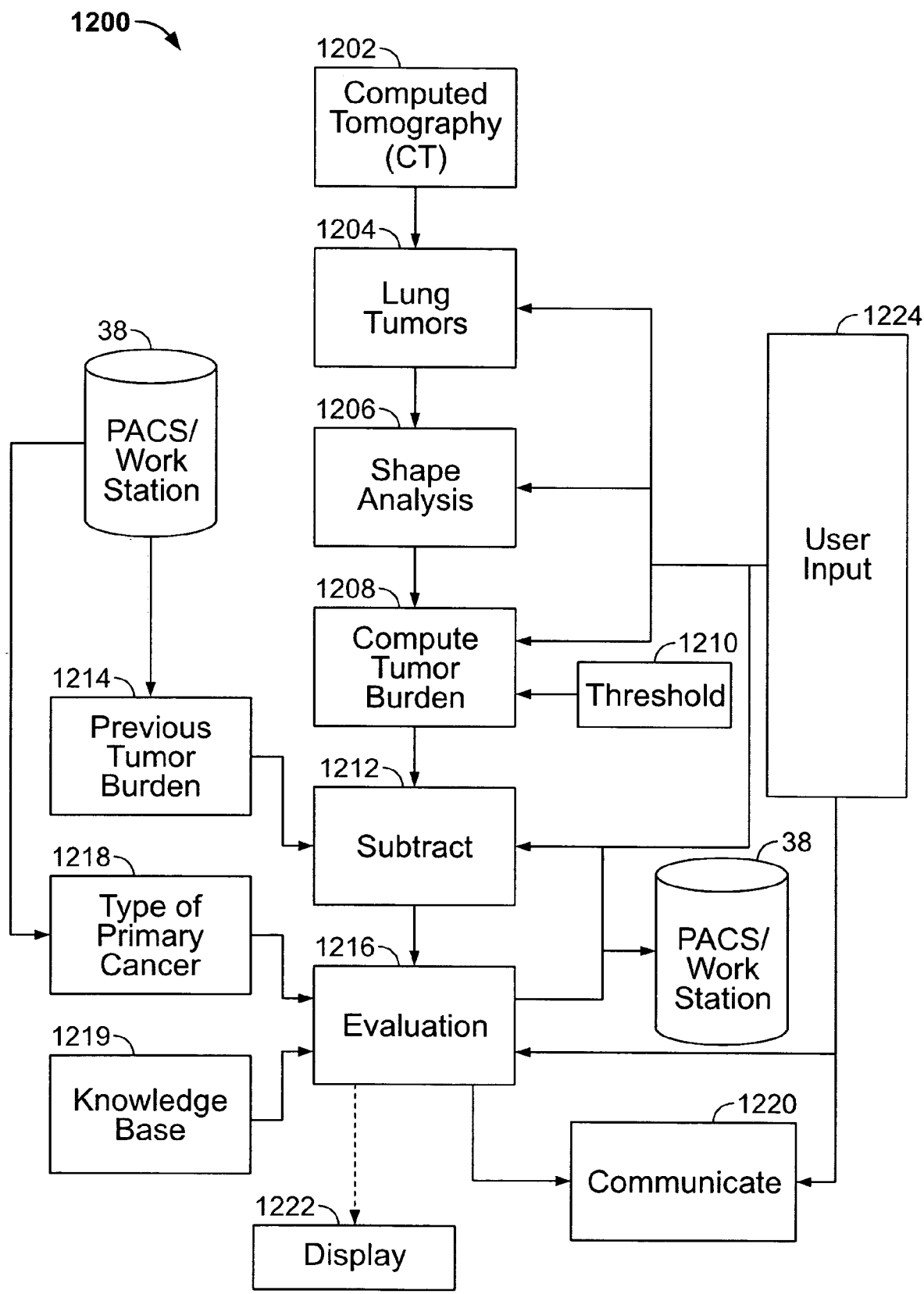
FIG. 12 is a data flow diagram of an exemplary embodiment of the present invention as applied to a lung study using computed tomography (CT).

FIG. 12 is a data flow diagram 1200 of an exemplary embodiment of the present invention as applied to a lung study using computed tomography (CT). Multidimensional data is obtained using a CT scan 1202. The CT image data 1204 may include a segment of a patient that includes lung tissue of interest. Image data 1204 may be processed 1206 using 3D shape based filtering to localize a center of mass for tissue that meets the predetermined criteria for the 3D shape based filtering. The processed data may be analyzed using a selectable threshold 1210, such as a high threshold, low threshold, or high-low threshold to detect spherical regions in the image data. The identified locations total voxels are aggregated 1208 to form a tumor burden index and the results may be trended using an analysis such as subtraction 1212 over longitudinal exams using previous indices 1214 for change determination. In an alternative embodiment, a plurality of spherical regions in the image data may be detected using 3D shape based filtering followed by post processing to determine the center of mass of each cluster of detections. Each of the identified locations is input to a volumetric segmentation algorithm that estimates the volume of individual tumor candidates. The individual volume estimates are aggregated to form a total tumor volume. The results may be trended over longitudinal exams for change determination.

The detection of all regions can also be filtered so as to automatically only follow-up the evolution of a subset of tumors. Such measurements may include computing the evolution of the average or total volume of a subset of tumors and/or computing a maximum decrease/increase in volume of any of these tumors. A decision rules engine 1216 may be applied to the aggregate data such that changes in the number of tumors, an individual tumor size, an aggregate tumor size, and/or other volume of interest attributes may be used to determine a diagnosis and/or recommended course of treatment. Decision rules engine 1216 receives data from a source 1218 of patient metadata that may include, but is not limited to, patient genetic data, patient family history data, histopathology data, patient allergy data, and a patient medical history that includes a type of the primary cancer of the patient. Decision rules engine 1216 may include various databases 1219, such as a diagnosis knowledge base and/or a disease-treatment knowledge base that may reside locally in a memory accessible through data storage device 38. Databases that are accessible via a network such as the Internet may also be used by decision rules engine 1216. The diagnosis and recommended treatment and other results of applying decision rule engine 1216 may be communicated 1220 to a user via a display 1222 and may be transmitted over a network to other users. The results of applying decision rule engine 1216 may be binary responses, such as, the tumor burden is better or worse. The response may be a metric such as a volume quantity of tumor burden or number of tumor nodules. The response may include a detailed history of the patient detailing a progression of a disease and/or treatment.

User input from a user input module 1224 may be used to modify or edit the algorithm used to generate the output update parameters or update parameters used by the algorithm. User input module 1224 may be a stand alone man machine interface or may be a part of an existing imaging system controller. The user input may be manually entered into input module 1224 or may be an output of a logic code segment embodied in software, firmware, and/or hardware accessible to system 10.

Although the preceding embodiments are discussed with respect to medical imaging, it is understood that the image acquisition and processing methodology described herein is not limited to medical applications, but may be utilized in non-medical applications.

The description applying the above embodiments is merely illustrative. As described above, embodiments in the form of computer-implemented processes and apparatuses for practicing those processes may be included. Also included may be embodiments in the form of computer program code containing instructions embodied in tangible data storage device 38 on any computer-readable storage medium, wherein, when the computer program code is loaded into and executed by a computer, the computer becomes an apparatus for practicing the invention. Also included may be embodiments in the form of computer program code, for example, whether stored in a storage medium, loaded into and/or executed by a computer, or as a propagated data signal transmitted, whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be appreciated that the use of first and second or other similar nomenclature for denoting similar items is not intended to specify or imply any particular order unless otherwise stated.

The above-described embodiments of an imaging system provide a cost effective and reliable means for monitoring tumor burden in a patient. More specifically, tumors and tumor candidates may be detected using shape based or other filtering and the aggregate of the tumor burden may be trended over time or a population. Decision rules may be applied to the analysis s of tumor burden such that a knowledge base may facilitate diagnosis and treatment recommendations. As a result, the described methods facilitate quantization and monitoring of tumor burden in a patient in a cost-effective and reliable manner.

Exemplary embodiments of imaging system methods and apparatus are described above in detail. The imaging system components illustrated are not limited to the specific embodiments described herein, but rather, components of each imaging system may be utilized independently and separately from other components described herein. For example, the imaging system components described above may also be used in combination with different imaging systems. A technical effect of the various embodiments of the systems and methods described herein include facilitating quantization and monitoring of tumor burden in a patient.

While the invention has been described in terms of various specific embodiments, those skilled in the art will recognize that the invention can be practiced with modification within the spirit and scope of the claims.

What is claimed is:

1. A system for quantification of a selected attribute of an image volume, said system comprising a processor configured to:
   receive an image dataset for a volume of interest from at least one imaging modality;
   perform multi-resolution sampling on the volume of interest;
   perform real-time three-dimensional (3D) shape-based Gaussian filtering on the dataset, said real-time 3D shape-based Gaussian filtering comprising determining a cylindrical response and a spherical response;
   process the dataset for a selected attribute to obtain a plurality of responses from the real-time shape-based Gaussian filtering, said processing the dataset for the selected attribute comprising determining a degree of cylindricalness to eliminate vessel-like cylindrical responses from the obtained responses;
   identify a center of each response of the plurality of responses to provide a plurality of spatial references;
   assess a volume of each response of the plurality of responses using a respective spatial reference of the plurality of spatial references; and
   compute a volume index of an aggregate of the plurality of obtained responses based on the assessed volumes, the computed volume index representing a volume of the plurality of obtained responses.

2. A system in accordance with claim 1 wherein said processor is further configured to monitor a change of the volume index using at least temporally-spaced datasets, the change of the volume index automatically calculated based on a subset of the plurality of responses.

3. A system in accordance with claim 1 wherein said at least one imaging modality comprises at least one of an X-ray modality, a CT modality, an ultrasound modality, a magnetic resonance imaging (MRI) modality, a positron emission tomography (PET) modality, a nuclear medicine modality, an optical modality, and a combination of modalities.

4. A system in accordance with claim 1 wherein said processor is further configured to filter the dataset to determine a quantity of the selected attribute.

5. A system in accordance with claim 4 wherein said processor is further configured to at least one of filter the dataset for at least one of a texture, a shape, a Hounsfield number, a standard uptake value (SUV), an anatomical structure, and a diameter, and derive at least one of a perfusion and a flow from the dataset.

6. A system in accordance with claim 1 wherein said processor is further configured to receive a threshold value for the selected attribute from a user to determine at least one region of at least one of a shape and a texture.

7. A system in accordance with claim 1 wherein said processor is further configured to compute the volume index using a global quantity of the selected attribute in the volume of interest.

8. A system in accordance with claim 1 wherein said processor is further configured to compute the volume index using a plurality of quantities of the selected attribute in the volume of interest.

9. A system in accordance with claim 1 wherein the volume of interest represents a portion of a patient, said processor is further configured to:
receive metadata for the patient;
receive a second volume index from at least one of a previous dataset of the volume of interest and a dataset from a second volume of interest;
determine a change between the volume index and the second volume index; and
apply at least one decision rule to the determined change to determine a variation in the volume of interest.

10. A system in accordance with claim 9 wherein said processor is further configured to receive at least one of patient genetic data, patient family history data, histo-pathology data, patient allergy data, patient medical history, and a disease-treatment knowledge base.

11. A system in accordance with claim 9 wherein said processor is further configured to generate an output of at least one of a diagnosis, a treatment, a binary response, and a metric response using the at least one applied decision rule and the patient metadata.

12. An imaging system comprising an image acquisition module for acquiring image data, a controller configured to control the image acquisition portion, and a processor configured to quantify a selected attribute of an image volume and monitor changes of the selected attribute, said processor further configured to
receive an image dataset for a volume of interest from at least one of an X-ray modality, a CT modality, an ultrasound modality, a magnetic resonance imaging (MRI) modality, a positron emission tomography (PEI) modality, a nuclear medicine modality, an optical modality, and a combination of modalities;
perform multi-resolution sampling on the volume of interest:
process the dataset for a selected attribute to obtain a plurality of responses by performing a real-time three-dimensional (3D) shape-based Gaussian filtering on the dataset, said processing the dataset comprising determining a cylindrical response and a spherical response and determining a degree of cylindricalness to eliminate vessel-like cylindrical responses from the obtained plurality of responses;
identify a center of each response of the plurality of responses to provide a plurality of spatial references;
assess a volume of each response of the plurality of responses using a respective spatial reference of the plurality of spatial references; and
compute a volume index of an aggregate of the plurality of obtained responses based on the assessed volumes, the computed volume index representing a volume of the plurality of obtained responses.

13. An imaging system in accordance with claim 12 wherein said processor is further configured to monitor a change of the volume index by automatically following-up on a subset of the plurality of responses.

14. An imaging system in accordance with claim 12 wherein said processor is further configured to receive at least one of radiology data, oncology data, neurological data, cardiac data, chest data, musculoskeletal data, vascular data, and interventional data.

15. An imaging system in accordance with claim 12 wherein said processor is further configured to filter the dataset to determine a quantity of the selected attribute wherein the selected attribute comprises at least one of a texture, a shape, a Hounsfield number, a standard uptake value (SUV), an anatomical structure, a derived quantity, a time, and a diameter.

16. An imaging system in accordance with claim 12 wherein the selected attribute comprises at least one of a perfusion and a flow, said processor is further configured to derive at least one of a perfusion and a flow from the dataset.

17. An imaging system in accordance with claim 12 wherein said processor is further configured to:
receive a threshold value for the selected attribute;
detect a plurality of regions that each include the selected attribute based on the received threshold; and
aggregate the plurality of regions to compute the volume index.

18. An imaging system in accordance with claim 12 wherein said processor is further configured to compute the volume index using at least one of a global quantity of the selected attribute in the volume of interest and a plurality of quantities of the selected attribute in the volume of interest.

19. An imaging system in accordance with claim 12 wherein the volume of interest represents a portion of a patient, said processor is further configured to:
receive a second volume index from at least one of a previous dataset of the volume of interest and a dataset from a second volume of interest;
determine a change between the volume index and the second volume index;
receive metadata for the patient including at least one of patient genetic data, patient family history data, histo-pathology data, patient allergy data, patient medical history, and a disease-treatment knowledge base; and
apply at least one decision rule to the determined change to determine a change in the volume of interest.

20. An imaging system in accordance with claim 19 wherein said processor is further configured to generate an output of at least one of a diagnosis, a treatment, a binary response, and a metric response using the at least one applied decision rule and the patient metadata.

21. A method for quantification of a selected attribute of an image volume and monitoring changes of the selected attribute, said method implemented using a processor configured to:
receive an image dataset for a volume of interest;
perform multi-resolution sampling on the volume of interest;

process the dataset for a selected attribute to obtain a plurality of responses by performing a real-time three-dimensional (3D) shape-based Gaussian filtering on the dataset, said processing the dataset comprising determining a cylindrical response and a spherical response and determining a degree of cylindricalness to eliminate vessel-like cylindrical responses from the obtained plurality of responses;

identify a center of each response of the plurality of responses to provide a plurality of spatial references;

assess a volume of each response of the plurality responses using a respective spatial reference of the plurality of spatial references;

compute a volume index of an aggregate of the plurality of obtained responses based on the assessed volumes, the computed volume index representing a volume of the plurality of obtained responses; and output the computed volume index.

22. A method in accordance with claim 21, wherein said method is implemented using a processor further configured to monitor a change of the volume index.

23. A method in accordance with claim 22 wherein said method is implemented using a processor further configured to:
receive a second volume index from at least one of a previous dataset of the volume of interest and a dataset from a second volume of interest;
determine a change between the volume index and the second volume index; and
apply at least one decision rule to the determined change to determine a variation in the volume of interest.

24. A method in accordance with claim 23 wherein the volume of interest represents a portion of a patient, said method implemented using a processor further configured to receive metadata for the patient.

25. A method in accordance with claim 24 wherein said method is implemented using a processor further configured to receive at least one of patient genetic data, patient family history data, histo-pathology data, patient allergy data, patient medical history, and a disease-treatment knowledge base.

26. A method in accordance with claim 25, wherein said method is implemented using a processor further configured to generate an output of at least one of a diagnosis, a treatment, a binary response, and a metric response using the at least one applied decision rule and the patient metadata.

27. A method in accordance with claim 21 wherein said method is implemented using a processor further configured to perform the shape-based Gaussian filtering on the dataset to determine a center of mass of each response of the plurality of responses.

28. A method in accordance with claim 27, wherein said method is implemented using a processor further configured to:
segment each response of the plurality of responses using the determined centers of mass; and
estimate the volume of each response of the plurality of responses using the segmented responses.

29. A method in accordance with claim 21 wherein said method is implemented using a processor further configured to filter the dataset to determine a quantity of the selected attribute.

30. A method in accordance with claim 29 wherein said method is implemented using a processor further configured to derive the selected attribute from the dataset.

31. A method in accordance with claim 30 wherein said method is implemented using a processor further configured to determine at least one of a perfusion and a flow.

32. A method in accordance with claim 29 wherein said method is implemented using a processor further configured to filter the dataset for at least one of a texture, a shape, a Hounsfield number, a standard uptake value (SUV), an anatomical structure, and a diameter.

33. A method in accordance with claim 21 wherein said method is implemented using a processor further configured to receive a threshold value for the selected attribute.

34. A method in accordance with claim 21 wherein said method is implemented using a processor further configured to compute the volume index using a global quantity of the selected attribute in the volume of interest.

35. A method in accordance with claim 21 wherein said method is implemented using a processor further configured to compute the volume index using a plurality of quantities of the selected attribute in the volume of interest.

36. A method in accordance with claim 35 wherein said method is implemented using a processor further configured to compute a total quantity from the plurality of quantities.

37. A method in accordance with claim 21, wherein said method is implemented using a processor further configured to receive a change to at least one of an image processing algorithm and a image processing parameter from a user input module.

38. A method for quantification of a total tumor burden of at least a portion of a patient and monitoring changes of the total tumor burden, said method implemented using a processor configured to:
receive a multidimensional image dataset for a volume of interest;
perform multi-resolution sampling on the volume interest:
filter the multidimensional image dataset for a texture based on a spherically-shaped mass to obtain at least one response, said filtering uses a real-time three-dimensional (3D) Gaussian filter, wherein the real-time 3D Gaussian filter further determines a cylindricalness of a response to eliminate vessel-like cylindrical responses from the obtained at least one response;
identify a center of the at least one response to provide at least one spatial reference;
assess at least one volume of the at least one response using the at least one spatial reference;
compute a tumor burden index in the volume of interest using the at least one volume, the computed tumor burden index representing a volume of the at least one obtained response; and
output the computed tumor burden index.

39. A method in accordance with claim 38, wherein said method is implemented using a processor further configured to:
receive a second tumor burden index from at least one of a previous dataset of the volume of interest and a dataset from a second volume of interest;
compare the tumor burden index and the second tumor burden index to determine a change between the tumor burden index and the second tumor burden index; and
apply at least one decision rule to the determined change to determine a trend of the tumor burden index in the volume of interest.

40. A method in accordance with claim 38 wherein said method is implemented using a processor further configured to filter the dataset to determine a quantity of the spherically-shaped mass in the volume of interest.

41. A method in accordance with claim 38 wherein said method is implemented using a processor further configured to receive a threshold value for determining the texture, the threshold value corresponds to a value for tumor tissue in the volume of interest.

42. A method in accordance with claim 38 wherein said method is implemented using a processor further configured to compute the tumor burden index using a global quantity of the texture in the volume of interest.

43. A method in accordance with claim 38 wherein said method is implemented using a processor further configured to compute the index using a plurality of quantities of the texture in the volume of interest.

44. A method in accordance with claim 43 wherein said method is implemented using a processor further configured to compute a total quantity from the plurality of quantities.

45. A method in accordance with claim 38 wherein said method is implemented using a processor further configured to receive patient metadata including at least one of patient genetic data, patient family history data, histo-pathology data, patient allergy data, patient medical history, and a disease-treatment knowledge base.

46. A method in accordance with claim 45, wherein said method is implemented using a processor further configured to generate an output of at least one of a diagnosis, a treatment, a binary response, and a metric response using the at least one applied decision rule and the patient metadata.

47. A method in accordance with claim 38 wherein said method is implemented using a processor configured to receive a multidimensional computed tomography (CT) image dataset for the volume of interest, said method implemented using a processor further configured to:

receive a multidimensional nuclear medicine (NM) image dataset: for the volume of interest determine an anatomic tumor burden (ATB) using the CT image dataset;

determine a physiologic tumor burden (PTB) using the NM image dataset; and determine a change in the ATB and PTB since a previous determination.

48. A method in accordance with claim 38, wherein said method is implemented using a processor further configured to receive a change to at least one of an image processing algorithm and a image processing parameter from a user input module.

\* \* \* \* \*